US012780203B2

(12) United States Patent
Varney et al.

(10) Patent No.: US 12,780,203 B2
(45) Date of Patent: Nov. 3, 2026

(54) METHODS AND SYSTEMS FOR COORDINATING LAUNCH CONTROL FOR VEHICLES FOR RACING

(71) Applicant: GM GLOBAL TECHNOLOGY OPERATIONS LLC, Detroit, MI (US)

(72) Inventors: Trevor S. Varney, Wolverine Lake, MI (US); Timothy Demetrio, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 10 days.

(21) Appl. No.: 19/009,308

(22) Filed: Jan. 3, 2025

(65) Prior Publication Data

US 2026/0192802 A1 Jul. 9, 2026

(51) Int. Cl.

*B60W 30/18* (2012.01)
*B60W 40/08* (2012.01)
*G06V 10/60* (2022.01)
*G06V 20/56* (2022.01)

(Continued)

(52) U.S. Cl.

CPC ...... *B60W 30/18027* (2013.01); *B60W 40/08* (2013.01); *G06V 10/60* (2022.01); *G06V 20/56* (2022.01); *G06V 20/597* (2022.01); *G06V 40/10* (2022.01); *B60W 2040/0818* (2013.01); *B60W 2300/28* (2013.01); *B60W 2420/403* (2013.01); *B60W 2510/18* (2013.01);

(Continued)

(58) Field of Classification Search

CPC ........... B60W 30/18027; B60W 40/08; B60W 2040/0818; B60W 2300/28; B60W 2420/403; B60W 2510/18; B60W 2540/10; B60W 2540/12; B60W 2540/229; G06V 10/60; G06V 20/56; G06V 20/597; G06V 40/10

See application file for complete search history.

(56) References Cited

U.S. PATENT DOCUMENTS 4,467,219 A * 8/1984 Reid ...................... H01H 43/04 180/315
RE32,474 E * 8/1987 Reid ...................... H01H 43/04 180/315

(Continued)

FOREIGN PATENT DOCUMENTS

DE 102010039418 A1 2/2012
DE 102014201132 A1 7/2015

(Continued)

*Primary Examiner* — Carl C Staubach

(74) *Attorney, Agent, or Firm* — Ingrassia Fisher & Lorenz, LLP | IFL

(57) ABSTRACT

In exemplary embodiments, methods and systems are provided for coordinating launch control for vehicles for racing, including systems having one or more cameras of a vehicle and a processor of the vehicle. The one or more cameras are configured to obtain exterior camera images as to a lighting tree of a track on which the vehicle is to participate in a race. The processor is coupled to the one or more cameras, and is configured to at least facilitate determining a starting time for the race, based on the exterior camera images as to the lighting tree; and automatically starting movement of the vehicle, in accordance with instructions provided by the processor, based on the starting time.

20 Claims, 3 Drawing Sheets

(51) Int. Cl.
*G06V 20/59* (2022.01)
*G06V 40/10* (2022.01)

(52) U.S. Cl.
CPC ..... *B60W 2540/10* (2013.01); *B60W 2540/12* (2013.01); *B60W 2540/229* (2020.02)

(56) References Cited

U.S. PATENT DOCUMENTS

| | | | | | |
|---|---|---|---|---|---|
| 5,600,185 | A * | 2/1997 | Hamma | B60W 30/1819 | 361/195 |
| 6,678,214 | B1 * | 1/2004 | McMahon | B60W 50/14 | 701/1 |
| 7,866,762 | B1 * | 1/2011 | Hamilton | B60T 13/74 | 303/20 |
| 9,540,007 | B1 * | 1/2017 | Davis | B60K 31/00 | |
| 10,035,060 | B1 * | 7/2018 | Swyers | A63F 3/00082 | |
| 12,091,011 | B1 * | 9/2024 | Khaja | B60W 50/085 | |
| 2015/0232026 | A1 * | 8/2015 | Lueke | B60W 50/14 | 701/1 |
| 2018/0319400 | A1 * | 11/2018 | Kleinau | B60W 30/18027 | |
| 2019/0135286 | A1 * | 5/2019 | Domingo | B60W 30/02 | |
| 2019/0272750 | A1 * | 9/2019 | Fukumoto | G08G 1/166 | |
| 2021/0171036 | A1 * | 6/2021 | Kohlhuber | G08G 1/09623 | |
| 2021/0229551 | A1 * | 7/2021 | Davis | B60K 35/28 | |
| 2023/0406313 | A1 * | 12/2023 | Adiprasito | B60W 30/18027 | |
| 2024/0262359 | A1 * | 8/2024 | Corallo | B60W 30/18027 | |

FOREIGN PATENT DOCUMENTS

| | | | |
|---|---|---|---|
| DE | 102015222805 | A1 | 5/2017 |
| DE | 102017002237 | A1 | 11/2017 |
| DE | 102018205753 | A1 | 10/2019 |
| DE | 102020126678 | A1 | 4/2022 |

* cited by examiner

METHODS AND SYSTEMS FOR COORDINATING LAUNCH CONTROL FOR VEHICLES FOR RACING

INTRODUCTION

The technical field generally relates to vehicles and, more specifically, to methods and systems for coordinating launch control for vehicles for racing, such as drag racing.

Certain vehicles today are equipped for racing, such as drag racing or other vehicle racing in which the vehicles are permitted to start propulsion based on one or more lighting trees.

Accordingly, it is desirable to provide improved methods and systems for coordinating launch control for vehicles, such as drag racing or other vehicle racing in which the vehicles are permitted to start propulsion based on one or more lighting trees. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes obtaining, via one or more cameras of a vehicle, exterior camera images as to a lighting tree of a track on which the vehicle is to participate in a race; determining, via a processor of the vehicle, a starting time for the race, based on the exterior camera images as to the lighting tree; and automatically starting movement of the vehicle, in accordance with instructions provided by the processor, based on the starting time.

Also in an exemplary embodiment, the automatic starting of the movement of the vehicle is performed via the instructions provided by the processor while a driver is not engaging a brake pedal of the vehicle, and while the driver is not engaging an accelerator pedal of the vehicle.

Also in an exemplary embodiment, the method further includes detecting a pattern of lights in the lighting tree, via the processor, using the exterior camera images; wherein the starting time is determined via initiation of a clock, via the processor, based on the detected pattern of the lights.

Also in an exemplary embodiment, the method further includes providing a holding braking torque once the lighting tree is detected and prior to the starting time for the race, in accordance with instructions provided by the processor that are implemented via a braking system of the vehicle.

Also in an exemplary embodiment, the providing of the holding braking torque is performed regardless of engagement of a brake pedal of the vehicle via a driver of the vehicle.

Also in an exemplary embodiment, the method further includes providing a staging torque once the lighting tree is detected and prior to the starting time for the race, in accordance with instructions provided by the processor that are implemented via a drive system of the vehicle.

Also in an exemplary embodiment, the providing of the staging torque is performed regardless of engagement of an accelerator pedal of the vehicle via a driver of the vehicle.

Also in an exemplary embodiment, the step of automatically starting movement of the vehicle includes automatically releasing the holding braking torque, and automatically initiating the providing propulsion torque for movement of the vehicle to start the race, in accordance with instructions provided by the processor, based on the starting time and prior to the starting time, such that movement of the vehicle begins at the starting time.

Also in an exemplary embodiment, the method further includes obtaining, via one or more additional cameras, interior camera images as to a driver of the vehicle; determining, via the processor, whether the driver is attentive, based on the interior camera images; and automatically releasing the holding braking torque, and automatically initiating the providing propulsion torque for movement of the vehicle to start the race, in accordance with instructions provided by the processor, only when it is determined that the driver is attentive.

In another exemplary embodiment, a system is provided that includes one or more cameras of a vehicle and a processor of the vehicle. The one or more cameras are configured to obtain exterior camera images as to a lighting tree of a track on which the vehicle is to participate in a race. The processor is coupled to the one or more cameras, and is configured to at least facilitate determining a starting time for the race, based on the exterior camera images as to the lighting tree; and automatically starting movement of the vehicle, in accordance with instructions provided by the processor, based on the starting time.

Also in an exemplary embodiment, the automatic starting of the movement of the vehicle is performed via the instructions provided by the processor while a driver is not engaging a brake pedal of the vehicle, and while the driver is not engaging an accelerator pedal of the vehicle.

Also in an exemplary embodiment, the processor is further configured to at least facilitate detecting a pattern of lights in the lighting tree using the exterior camera images; and determining the starting time via initiation of a clock based on the detected pattern of the lights.

Also in an exemplary embodiment, the processor is further configured to at least facilitate providing a holding braking torque once the lighting tree is detected and prior to the starting time for the race, in accordance with instructions provided by the processor that are implemented via a braking system of the vehicle.

Also in an exemplary embodiment, the processor is further configured to at least facilitate providing the holding braking torque regardless of engagement of a brake pedal of the vehicle via a driver of the vehicle.

Also in an exemplary embodiment, the processor is further configured to at least facilitate providing a staging torque once the lighting tree is detected and prior to the starting time for the race, in accordance with instructions provided by the processor that are implemented via a drive system of the vehicle.

Also in an exemplary embodiment, the processor is further configured to at least facilitate providing the staging torque is performed regardless of engagement of an accelerator pedal of the vehicle via a driver of the vehicle.

Also in an exemplary embodiment, the processor is further configured to at least facilitate automatically releasing the holding braking torque, and automatically initiating the providing propulsion torque for movement of the vehicle to start the race, in accordance with instructions provided by the processor, based on the starting time and prior to the starting time, such that movement of the vehicle begins at the starting time.

Also in an exemplary embodiment, the system further includes one or more additional cameras that are configured to obtain interior camera images as to a driver of the vehicle; and the processor is further coupled to the one or more additional cameras and is further configured to at least facilitate determining whether the driver is attentive, based on the interior camera images; and automatically releasing the holding braking torque, and automatically initiating the providing propulsion torque for movement of the vehicle to start the race, in accordance with instructions provided by the processor, only when it is determined that the driver is attentive.

In another exemplary embodiment, a vehicle is provided that includes a body, a drive system, a braking system, one or more cameras, and a processor. The drive system is configured to move the body. The braking system is configured to provide braking torque for the vehicle. The one or more cameras are configured to obtain exterior camera images as to a lighting tree of a track on which the vehicle is to participate in a race. The processor is coupled to the drive system, the braking system, and the one or more cameras, and is configured to at least facilitate detecting a pattern of lights in the lighting tree using the exterior camera images; determining a starting time for the race, based on the exterior camera images as to the lighting tree, via initiation of a clock based on the detected pattern of the lights; providing a holding braking torque once the lighting tree is detected and prior to the starting time for the race, in accordance with instructions provided by the processor that are implemented via the braking system, regardless of engagement of a brake pedal of the vehicle via a driver of the vehicle; providing a staging torque once the lighting tree is detected and prior to the starting time for the race, in accordance with instructions provided by the processor that are implemented via the drive system, regardless of engagement of an accelerator pedal of the vehicle via a driver of the vehicle; and automatically starting movement of the vehicle, in accordance with instructions provided by the processor, via automatically releasing the holding braking torque, and automatically initiating providing of propulsion torque for movement of the vehicle to start the race, in accordance with instructions provided by the processor, based on the starting time and prior to the starting time, such that movement of the vehicle begins at the starting time.

Also in an exemplary embodiment, the vehicle further includes one or more additional cameras that are configured to obtain interior camera images as to a driver of the vehicle; and the processor is further coupled to the one or more additional cameras and is further configured to at least facilitate determining whether the driver is attentive, based on the interior camera images; and automatically releasing the holding braking torque, and automatically initiating the providing propulsion torque for movement of the vehicle to start the race, in accordance with instructions provided by the processor, only when it is determined that the driver is attentive.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
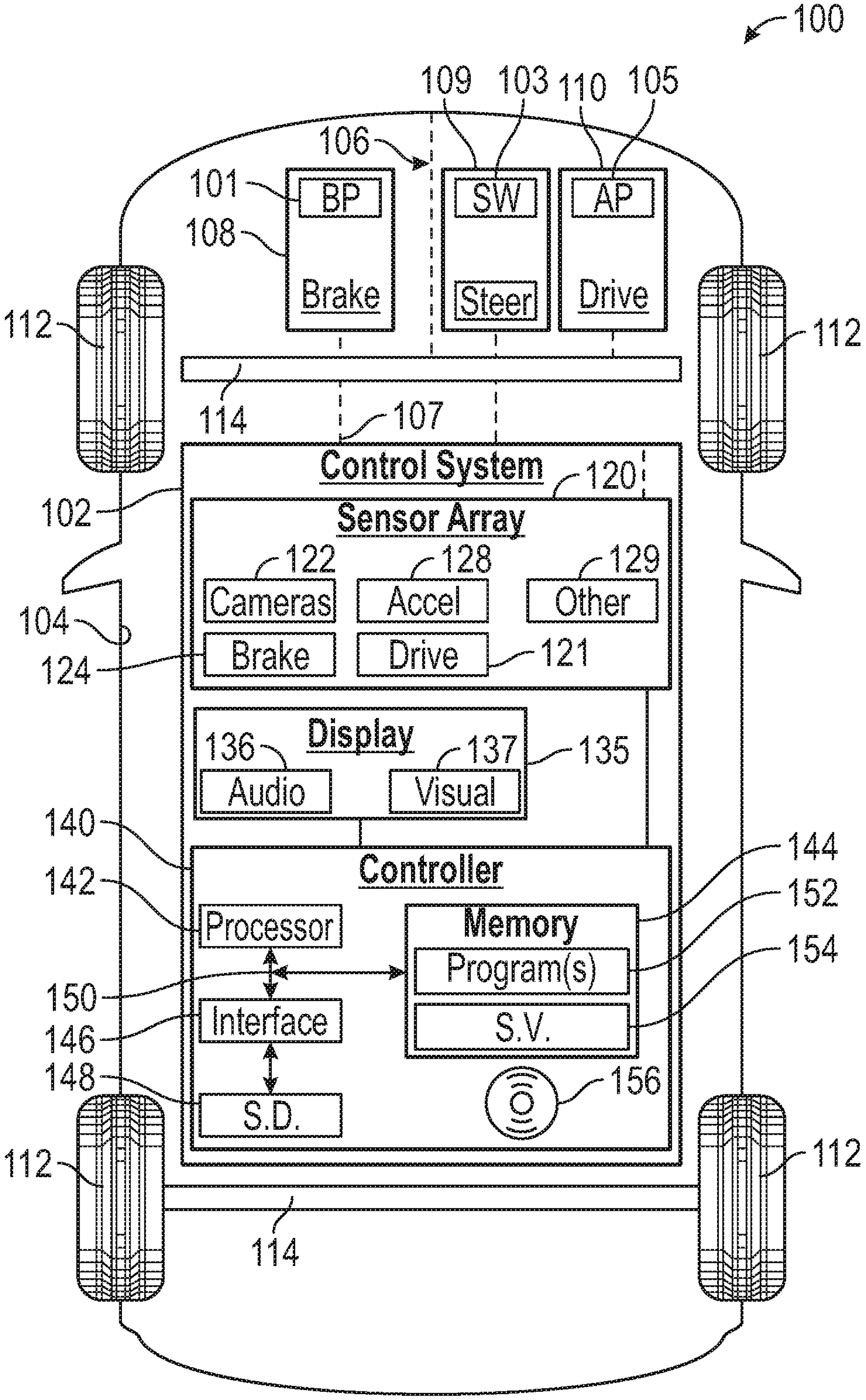
FIG. 1 is a functional block diagram of a vehicle that includes a control system for coordinating launch control for vehicles for racing, such as drag racing, in accordance with exemplary embodiments.

FIG. 1 illustrates a vehicle 100, according to an exemplary embodiment. As described in greater detail further below, the vehicle 100 includes a control system 102 that is configured for coordinating launch control for vehicles for racing, such as drag racing, in accordance with exemplary embodiments.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, the vehicle 100 is configured to be driven by a human driver. Also in various embodiments, the control system 102 coordinates launch control for vehicles for racing, such as drag racing, such that vehicle 100 propulsion begins as possible once permitted by the lighting tree that starts the race.

The vehicle 100 includes a body 104 that is arranged on a chassis 106. The body 104 substantially encloses other components of the vehicle 100. The body 104 and the chassis 106 may jointly form a frame. The vehicle 100 also includes a plurality of wheels 112. The wheels 112 are each rotationally coupled to the chassis 106 near a respective corner of the body 104 to facilitate movement of the vehicle 100. In one embodiment, the vehicle 100 includes four wheels 112, although this may vary in other embodiments (for example for trucks and certain other vehicles).

As depicted in FIG. 1, the vehicle includes a braking system 108 in various embodiments. In exemplary embodiments, the braking system 108 controls braking of the vehicle 100 using braking components that are controlled via inputs provided by a driver (e.g., via a brake pedal 101 in certain embodiments), and that are also automatically controlled via the control system 102 in certain situations such as the coordinated launch control for the vehicle 100 at the start of the race.

In exemplary embodiments, the vehicle 100 also includes a steering system 109 that controls steering of the vehicle 100. In various embodiments, the steering system 109 controls steering of the vehicle 100 via steering components, for example that including a steering column that is coupled to the axles 114 and/or the wheels 112, and that is controlled via inputs provided by a driver via a steering wheel 103.

Also in exemplary embodiments, a drive system 110 is mounted on the chassis 106, and drives the wheels 112, for example via axles 114. In certain embodiments, the drive system 110 comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. Also in exemplary embodiments, the drive system 110 controls propulsion of the vehicle 100 in accordance with via inputs provided by a driver (e.g., via an accelerator pedal 105), and that are also automatically controlled via the control system 102 in certain situations such as the coordinated launch control for the vehicle 100 at the start of the race.

In the embodiment depicted in FIG. 1, the control system 102 is coupled to the braking system 108 and the drive system 110. In various embodiments, the control system 102 is coupled to the braking system 108 and the drive system 110 via one or more communications link 107, such as a vehicle CAN bus in one embodiment. In certain embodiments, the control system 102 may also be coupled to the steering system 109 and/or one or more other vehicle systems and/or components.

In various embodiments, as noted above, the control system 102 coordinates launch control for vehicles for racing, such as drag racing, such that vehicle 100 propulsion begins as possible once permitted by the lighting tree that starts the race. In addition and more specifically, in various embodiments as described in greater detail further below (including in connection with process 200 depicted in FIGS. 2 and 3 and described below in connection therewith), the control system 102 allows the driver to take his or her foot off the brake pedal 101, and the control system 102 automatically coordinates a brake holding torque and engine propulsion torque that is timed to the lighting tree's indication for starting the race.

As depicted in FIG. 1, in various embodiments, the control system 102 includes a sensor array 120, a display system 135, and a controller 140, as described in greater detail below.

In various embodiments, the sensor array 120 includes various sensors that obtain sensor data as to the vehicle 100, for use in coordinating launch control for vehicles for racing. In the depicted embodiment, the sensor array 120 includes cameras 122 as well as one or more drive selection sensors 121, brake pedal sensors 124, and accelerator pedal sensors 128. In certain embodiments, the sensor array 120 may also include one or more other sensors 129.

In various embodiments, the one or more drive selection sensors 121 detect a driver's input as to the driver's selection as to a drive mode for the vehicle 100, including a racing mode. In certain embodiments, the drive selection sensors 121 may be part of or coupled to one or more gear selection input devices such as a gear shift stick, button, and/or knob, a touch screen, and/or one or more other types of input devices.

In an exemplary embodiment, the cameras 122 obtain camera sensor data pertaining to the vehicle 100 and its surroundings. Specifically, in various embodiments, the cameras 122 include one or more exterior facing cameras 122 that obtain exterior camera data as to a lighting tree for starting a race in which the vehicle 100 is to participate, in addition one or more interior facing cameras 122 that obtain interior camera data pertaining to a driver of the vehicle 100 (and that is used for monitoring an attentiveness of the driver).

In an exemplary embodiment, the one or more brake pedal sensors 124 obtain braking sensor data as to a driver's braking inputs and engagement of the braking system 108, including the driver's engagement and release of the brake pedal 101 in various embodiments.

In an exemplary embodiment, the one or more accelerator pedal sensors 128 obtain accelerator sensor data as to a driver's acceleration inputs and engagement of the drive system 110, including the driver's engagement and release of the accelerator pedal 105 in various embodiments.

In addition, in certain embodiments, the sensor array 120 may also include one or more other sensors 129, such as one or more other types of input sensors (e.g., one or more buttons, switches, touch screen display sensors, or other sensors for a driver to provide inputs to switch driving modes, and so on.

In various embodiments, the display system 135 is configured to provide one or more notification and cues for the driver to take appropriate actions (such as engaging and/or releasing the brake pedal 101 and/or accelerator pedal 105, and so on) as requested by the control system 102. (i) a visual component 137 (e.g., including a display screen) that provides visual notifications for the driver; and (ii) an audio component 136 (e.g., including a speaker) that provides an audio notifications for the driver. In certain embodiments, the display system 135 may also include one or more other components, such as a haptic component that provides one or more haptic notifications for the driver (e.g., by vibrating a seat of the driver).

In various embodiments, the controller 140 is coupled to the sensor array 120 and the display system 135, in addition to the braking system 108 and the drive system 110. In various embodiments, the controller 140 may also be coupled to one or more other vehicle systems. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) provides, among other functionality, the coordinating of launch control for the vehicle 100 for racing, such a. In various embodiments, the controller 140 provides these and other functions in accordance with the steps of the process 200 of FIGS. 2 and 3.

In various embodiments, the controller 140 (and, in certain embodiments, the control system 102 itself) is disposed within the body 104 of the vehicle 100. In one embodiment, the control system 102 is mounted on the chassis 106. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIGS. 2 and 3.

The memory 144 can be any type of suitable memory. For example, the memory 144 may include various types of dynamic random access memory (DRAM) such as synchronous dynamic random access memory (SDRAM), the various types of static RAM (SRAM), and the various types of non-volatile memory, such as programmable read-only memory (PROM) and flash. In certain examples, the memory 144 is located on and/or co-located on the same computer chip as the processor 142. In the depicted embodiment, the memory 144 stores the above-referenced program 152 along with stored values 154 (e.g., threshold values for the process 200 of FIGS. 2 and 3 in various embodiments).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 discussed further below in connection with FIGS. 2 and 3. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
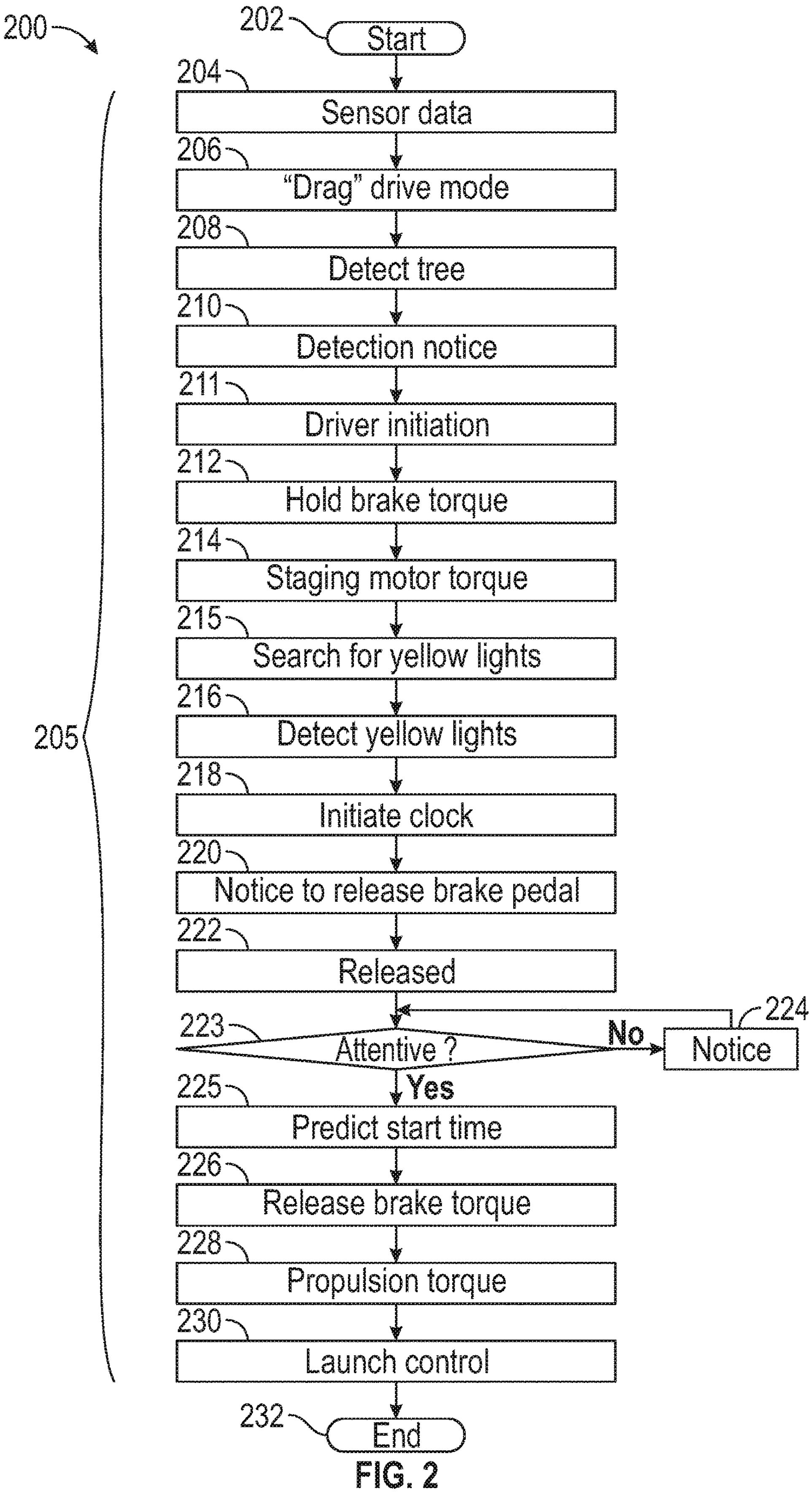
FIG. 2 is a flowchart of a process for coordinating launch control for vehicles for racing, such as drag racing, and that can be implemented in connection with the vehicle of FIG. 1 and the control system thereof, in accordance with exemplary embodiments.

FIG. 2 is a flowchart of a process 200 for coordinating launch control for vehicles for racing, such as drag racing, in accordance with exemplary embodiments. In various embodiments, the process 200 can be implemented in connection with the vehicle 100, including the control system 102 and other components thereof. The process 200 is described below in connection with FIG. 2 as well as FIG. 3, which depicts a subroutine of the process 200 of FIG. 2 alongside an exemplary vehicle starting lighting tree in accordance with an exemplary embodiment.

As depicted in FIG. 2, in various embodiments, the process 200 begins at step 202. In one embodiment, the process 200 begins when a vehicle drive or ignition cycle begins, for example when a driver enters the vehicle for operation of the vehicle, and/or when the vehicle 100 is currently being operated by the driver (e.g., as detected one or more of the sensors of the sensor array 120 of FIG. 1 in certain embodiments) on a race track lined up and preparing for racing, such as drag racing. In various embodiments, while the process 200 is described herein in connection with drag racing (e.g., on a drag racing strip), it will be appreciated that the process 200 (and the control system 102 may similarly be implemented in connection with other types of racing, such as autocross racing, road race courses, and the like) in various embodiments. In one embodiment, the steps of the process 200 are performed continuously during operation of the vehicle.

In various embodiments, sensor data is obtained (step 204). In various embodiments, the sensor data is obtained from various sensors of the sensor array 120 of FIG. 1, including the cameras 122 (including external camera images as to a vehicle start lighting tree and internal camera images as to a driver of the vehicle 100), drive selection sensors 121 (including the driver's selection of the driving mode, including a racing mode, for the vehicle 100), brake pedal sensors 124 (including as to the driver's engagement and release of the brake pedal 101), and accelerator pedal sensors 128 (including as to the driver's engagement and release of the accelerator pedal 105). In certain embodiments, this sensor data is continuously collected via the sensor array 120 throughout the process 200.

In various embodiments, the vehicle 100 enters the racing driving mode when selected by the driver (step 206). In various embodiments, the processor 142 of FIG. 1 places the vehicle 100 into the racing driver mode when the driver's selection of the racing driving mode is detected via one or more of the drive selection sensors 121 of FIG. 1.

In various embodiments, detection begins and is performed with respect to a lighting tree (step 208). Specifically, in various embodiments, one or more of the cameras 122 of FIG. 1 (specifically, one or more exterior facing cameras 122) continuously obtain external camera images of a lighting tree that is used on the racetrack (such as a drag racing strip) on which the vehicle 100 is disposed for starting a race (such as a drag race) in which the vehicle 100 is to participate.

Also in various embodiments, a detection notice is provided (step 210). Specifically, in various embodiments, the processor 142 provides instructions for the display system 135 of FIG. 1 to provide one or more notifications for the driver of the vehicle 100 that the lighting tree has been detected. In various embodiments, one or more audio and visual notifications are provided for the driver that the lighting tree has been detected, and further providing instructions for the driver to initiate launch control. In certain embodiments, the driver's initiation of the launch control is performed by the driver simultaneously engaging the brake pedal 101 and the accelerator pedal 105; however, this may vary in other embodiments. In addition, in certain embodiments, a verbal notification may be provided without a visual notification, or vice versa. Also in certain embodiments, one or more haptic notifications may also be provided (e.g., movement of a driver seat, or the like).

In various embodiments, the driver initiation of the launch control is detected (step 211). Specifically, in certain embodiments, one or more sensors of the sensor array 120 detect one or more inputs from the driver to initiate the launch control. In one embodiment, one or more brake pedal sensors 124 and accelerator pedal sensors detect the driver's simultaneous engagement of the brake pedal 101 and the accelerator pedal 105 to indicate the initiation of the launch control. In certain embodiments, one or more other driver inputs may be utilized.

In various embodiments, upon detection of the initiation of the launch control by the driver, braking torque is held (step 212). In certain embodiments, the processor 142 provides instructions to the braking system 108 of FIG. 1 that are implemented by the braking system 108 to automatically provide a predetermined amount of braking torque to hold the vehicle 100 in place, regardless of the driver's engagement of the brake pedal 101, as the vehicle 100 prepares to start the race.

Also in various embodiments, upon detection of the initiation of the launch control by the driver, braking torque is held (step 212). In certain embodiments, the processor 142 provides instructions to the braking system 108 of FIG. 1 that are implemented by the braking system 108 to automatically provide a predetermined amount of braking torque to hold the vehicle 100 in place, regardless of the driver's engagement of the brake pedal 101, as the vehicle 100 prepares to start the race.

Also in various embodiments, upon detection of the initiation of the launch control by the driver, motor torque is also provided (step 214). In certain embodiments, the processor 142 provides instructions to the drive system 110 of FIG. 1 that are implemented by the drive system 110 to automatically provide a predetermined amount of electric torque to a motor of the drive system 110 as the vehicle 100 prepares to start the race.

In various embodiments, searching is performed for light indications of the lighting tree (step 216). Specifically, in various embodiments, searching is performed for yellow lights of the lighting tree, to help determine a sequence for use in calculating when the start time will be for the race (i.e., at which point propulsion for the vehicle 100 may begin). In various embodiments, this is performed by the processor 142 using exterior camera data from the cameras 122.

Also in various embodiments, a clock is initiated (step 218). In various embodiments, the processor 142 initiates a clock based on the detected yellow lights, in order to provide a countdown until the start time for the race (i.e., at which point propulsion for the vehicle 100 may begin).

In various embodiments, an additional driver notice is provided (step 220). Specifically, in various embodiments, the processor 142 provides instructions for the display system 135 of FIG. 1 to provide one or more notifications for the driver of the vehicle 100 for the driver to disengage from the brake pedal. In various embodiments, one or more audio and visual notifications and/or audio notifications are provided to this effect. In certain embodiments, one or more haptic notices are also provided.

In various embodiments, detection is then performed as to the driver releasing the brake pedal (step 222). In various embodiments, this detection is performed via one or more brake pedal sensors 124 of FIG. 1.

In various embodiments, once a determination is made that the driver has released the brake pedal, a determination is also made as to whether the driver is attentive (step 224). Specifically, in various embodiments, facing the driver) are utilized to ensure that the driver is attentive (e.g., that the driver has his or her eyes open and focused forward and/or on a road in which the vehicle 100 is to travel, and so on).

In various embodiments, if it is determined that the driver is not attentive, then a notification is provided to the driver to confirm that the driver is paying attention (step 224) (e.g., via the display system 135 in accordance with instructions provided by the processor 142), after which the process 200 returns to step 223.

In various embodiments, once it is determined in an iteration of step 223 that the driver is attentive, then the process 200 proceeds to step 225, described directly below.

In various embodiments, during step 225, the start time for the race is predicted. Specifically, in various embodiments, the processor 142 determines the start time based on the detected lights (e.g., the yellow lights) along with patterns indicating when the start time is to occur (e.g., in combination with stored values 154 in the memory 144 of FIG. 1 pertaining to such patterns and the resulting start time).

In various embodiments, once it is determined that the start time is about to occur, then the brake torque is released (step 226) and the propulsion torque is provided (step 228) for the vehicle 100 to start the race. In various embodiments, within a fraction of a second of when the start time is about to occur, the processor 142 provides instructions to the braking system 108 to release the braking torque, which are then implemented via the braking system 108 as part of step 226. Similarly, also in various embodiments, within a fraction of a second of when the start time is about to occur, the processor 142 also provides instructions to the drive system 110 to provide propulsion torque in an amount sufficient for the vehicle 100 to begin the race, which are then implemented via the drive system 110 as part of step 228.

Also in various embodiments, other launch control features are initiated (step 230). In various embodiments, the control system 102 facilitates further movement of the vehicle 100 in accordance with driver inputs that are then executed via the braking system 108, steering system 109, and drive system 110 of FIG. 1.

In various embodiments, the process 200 then terminates at 232.

Figure 3:
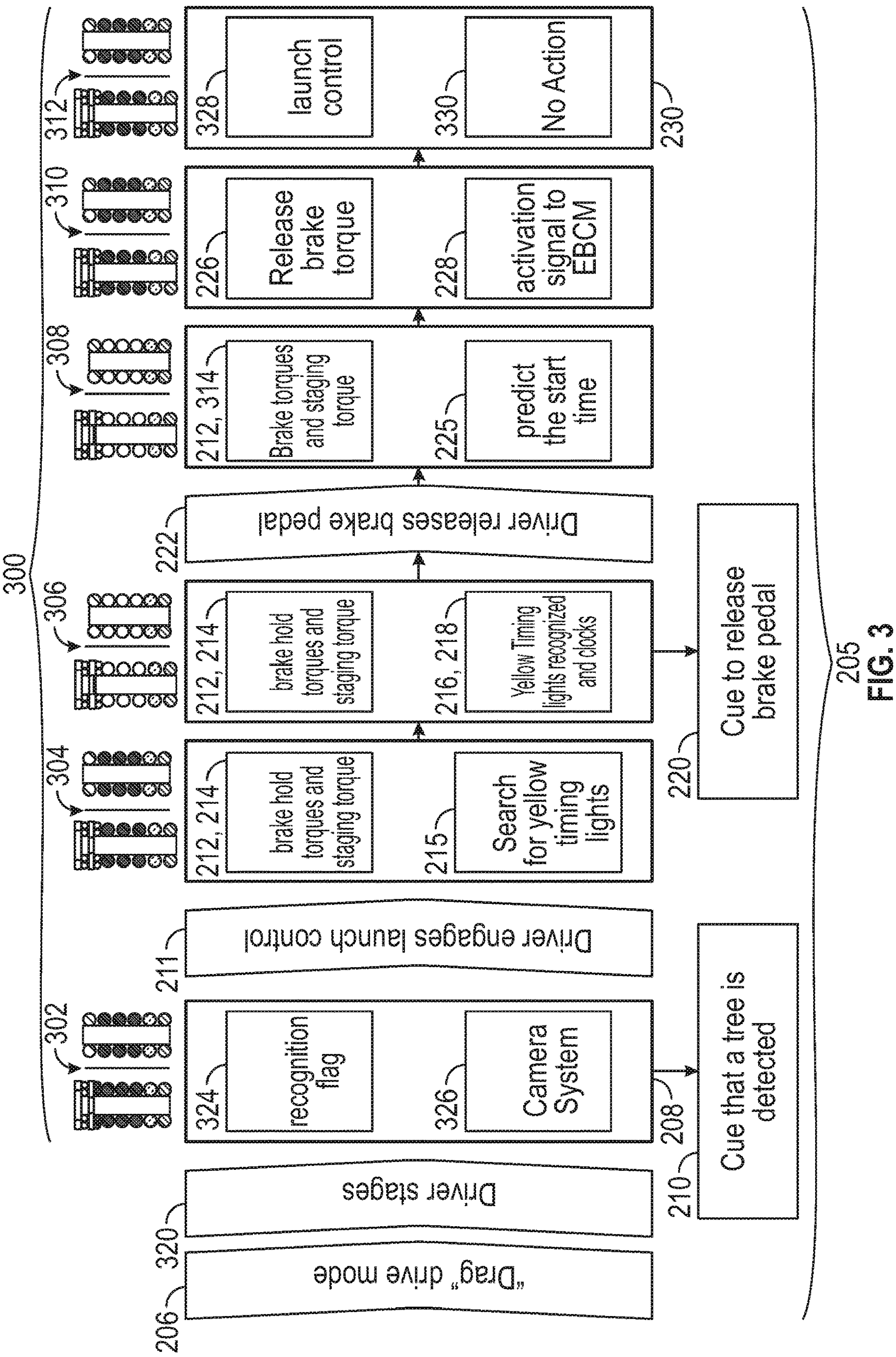
FIG. 3 is a flow diagram of a subroutine of the process of FIG. 2, in accordance with exemplary embodiments.

As depicted in FIG. 2, in various embodiments steps 206-230 are collectively referenced as sub-routine 205, which is also depicted in FIG. 3 along with exemplary lighting tree diagrams as described below.

Specifically, FIG. 3 depicts the sub-routine 205 from the process 200 of FIG. 2, alongside various lighting tree implementations 300 as shown in FIG. 3, in accordance with an exemplary embodiment.

As shown in FIG. 3, in an exemplary embodiment, following the driver's initiation of the racing drive mode in step 206, various driver states 320 are illustrated.

Also as shown in FIG. 3, in an exemplary embodiment, during the detection of the lighting tree of step 208, the control system 102 receives a lighting tree recognition flag (step 324), while the cameras 122 perform recognizes the lighting tree based on staging lights of the race track (step 326). During this time, also as depicted in FIG. 3, the notice of step 210 is provided regarding the recognition of the lighting tree (e.g., as described above in connection with FIG. 2). In various embodiments, during this time period, a first lighting tree configuration 302 appears and is recognized by the control system 102 via the cameras 122. In various embodiments, the first lighting tree configuration 302 represents an initial configuration for the lighting tree while the vehicle 100 in preparing to begin the race.

In certain embodiments, for step 208, the lights in configuration 302 of FIG. 3 indicate "pre-stage." In various embodiments, "pre-state" is a visual cue to the driver that the vehicle is approximately seven inches from the starting (stage) line. Also in various embodiments, when the drivers see the pre-stage light illuminate, they will proceed slowly until they reach the starting line. Also in various embodiments, depending on the equipment at the track, this can be represented either be the top row of small yellow (or amber) lights or the top semicircle of blue lights.

As shown in FIG. 3, in an exemplary embodiment, following the driver's initiation of the launch control in step 211, steps 212, 214, and 215 are performed as described above in connection with FIG. 2 (e.g., including holding the brake torque, providing the stating torque for the motor, and searching for the yellow timing lights). In various embodiments, during this time period, a second lighting tree configuration 304 appears and is recognized by the control system 102 via the cameras 122. In various embodiments, the second lighting tree configuration 304 represents a second configuration for the lighting tree while the vehicle 100 continues preparing to begin the race.

In various embodiments, the second lighting tree configuration 304 describes what will occur when the driver (and vehicle 100) have reached the starting line and have fully "staged." In various embodiments, depending on the equipment at the track, this may be represented either by both rows of small yellow (or amber) lights or the complete circle of blue lights at the top of the tree. In various embodiments, when the vehicle is stationary on the start line, the driver applies the brake pedal and accelerator pedal at or beyond the calibrated pedal position. In various embodiments, a visual coaching aid may also be utilized as with current GM vehicles, there will be a visual coaching aid in the gauge cluster for the driver).

As shown in FIG. 3, in an exemplary embodiment, subsequently step 220 is performed with the providing of the additional notice of step 220 for the driver to release the brake pedal, while steps 212 and 214 continue to be performed (with the holding of the brake torque and the providing of the stating torque for the motor), also while steps 216 and 218 are performed with the detection of the yellow timing lights and the initiation of the timer, respectively. In various embodiments, during this time period, a third lighting tree configuration 306 appears and is recognized by the control system 102 via the cameras 122. In various embodiments, the third lighting tree configuration 306 represents an additional configuration for the lighting tree as the vehicle 100 continues preparing to begin the race.

Also as shown in FIG. 3, in an exemplary embodiment, after the driver releases the brake pedal (as detected in step 222), steps 212 and 214 continue to be performed (with the holding of the brake torque and the providing of the stating torque for the motor), also while the starting time is predicted in step 225. In various embodiments, during this time period, a fourth lighting tree configuration 308 appears and is recognized by the control system 102 via the cameras 122. In certain embodiments, the fourth lighting tree configuration 308 represents a further additional configuration for the lighting tree as the vehicle 100 continues preparing to begin the race. In certain other embodiments, the fourth lighting tree configuration 308 may be the same as the third lighting configuration 306.

In various embodiments, during the third lighting configuration and/or the fourth lighting configuration 308 (which may be the same as one another in certain embodiments as noted above), and during the driver actions of steps 221-225 in certain embodiments, the yellow countdown lights are illuminated in some way. In certain embodiments, during a "Sportsman" setting, only one yellow light will be illuminated at a time, and there is a five hundred millisecond dwell at each light (starting from the top). In various embodiments, after the third and final light has been illuminated for a predetermined amount of time (e.g., five hundred milliseconds), the green light will be illuminated. In certain embodiments, the green light will stay illuminated until the drag race lighting tree is reset. Conversely, in certain embodiments, during a "professional" or "pro" setting, all three lights will be illuminated simultaneously for approximately four hundred milliseconds before turning off and illuminating the green light. Also in certain embodiments, depending on the light settings, the driver and vehicle 100 will have between four hundred and two thousand milliseconds to complete steps 216, 218, 220, and 222.

Also as shown in FIG. 3, in an exemplary embodiment, subsequently, as the race is about to begin (e.g., within a fraction of a second of the starting time), steps 226 and 228 are performed, in which the braking torque is released (step 226) and the propulsion torque is provided (step 228), as described earlier in connection with FIG. 2. In various embodiments, during this time period, a fifth lighting tree configuration 310 appears and is recognized by the control system 102 via the cameras 122. In various embodiments, the fifth lighting tree configuration 310 represents another configuration for the lighting tree as the starting time for the race is imminent (e.g., is only a matter of milliseconds from the beginning in certain embodiments).

In various embodiments, the duration of time that passes between the cameras sending the "activate launch" command and the vehicle 100 moving off of the stage-line is 't_delay' milliseconds. Specifically, in certain embodiments, if the point in time when the light turns green is 'T_green,' then step 228 occurs at T_green−t_delay, step 226 occurs a short time (e.g., ten milliseconds) later. In certain embodiments (e.g., a "sportsman" race", the third row of yellow lights would be illuminated. Conversely, in certain other embodiments (e.g., a "professional" or "pro" race), the three rows of yellow lights would still be illuminated (thereby making the internal clock essential in certain embodiments).

Also as shown in FIG. 3, in an exemplary embodiment, subsequently, as the race is begun and the starting time has come, launch control is performed (step 230), implementing the propulsion torque from step 228. In various embodiments, the vehicle 100 moves across the starting time to being the race at an appropriate speed and with minimal or no hesitation once the starting time begins (i.e., due to the actions of steps 226 and 228 just before the starting time occurred). In various embodiments, during the launch control of step 230, various launch control functionality (e.g., acceleration, braking, steering, and so on as appropriate and in accordance with inputs provided by the driver) is provided in step 328, whereas in step 330 the interior camera data (e.g. as to the monitoring of the driver) is no longer needed. In various embodiments, during this time period, a fifth lighting tree configuration 310 appears and is recognized by the control system 102 via the cameras 122. In various embodiments, a sixth lighting tree configuration 312 represents another configuration for the lighting tree as the starting time for the race has occurred.

Accordingly, methods, systems, and vehicles are disclosed for coordinating launch control for vehicles for racing, such as drag racing. In various embodiments, launch control for the vehicle 100 allows for propulsion torque to provided almost immediately when the lighting tree permits for the vehicle 100 at the start of the race, and without the driver having to engage the brake pedal 101 and accelerator pedal 105 in the moments leading up to the start of the race.

It will be appreciated that the systems, vehicles, and methods may vary from those depicted in the Figures and described herein. For example, the vehicle 100 of FIG. 1, the control system 102 of FIG. 1, and/or components thereof may vary in different embodiments. It will similarly be appreciated that the steps of the process 200 may differ from that depicted in FIGS. 2 and 3, and/or that various steps of the process 200 may occur concurrently and/or in a different order than that depicted in FIGS. 2 and 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining, via one or more cameras of a vehicle, exterior camera images as to a lighting tree of a track on which the vehicle is to participate in a race;

detecting a pattern of lights in the lighting tree, via the processor, using the exterior camera images, the pattern one of a plurality of possible racing lighting tree patterns, the detected pattern having known timing delays between each color sequence of the lighting tree;

matching, via the processor, the detected pattern in combination with stored values pertaining to such patterns and a resulting start time stored in a non-transitory computer readable storage medium;

determining, via a processor of the vehicle, a starting time for the race, based on the exterior camera images as to the lighting tree, and further based on the detected pattern of lights in the lighting tree and the matching in combination with the stored values, including the known timing delays between each color sequence of the lighting tree and the resulting start time, along with initiation of a clock, via the processor, based on the detected pattern of the lights; and automatically starting movement of the vehicle, in accordance with instructions provided by the processor, based on the starting time, based on the detected pattern of lights in the lighting tree and the matching in combination with the stored values, including the known timing delays between each color sequence of the lighting tree and the resulting start time, along with the clock initiated based on the detected pattern of lights.

2. The method of claim 1, wherein the automatic starting of the movement of the vehicle is performed via the instructions provided by the processor while a driver is not engaging a brake pedal of the vehicle, and while the driver is not engaging an accelerator pedal of the vehicle.

3. The method of claim 1, further comprising:

providing a holding braking torque once the lighting tree is detected and prior to the starting time for the race, in accordance with instructions provided by the processor that are implemented via a braking system of the vehicle.

4. The method of claim 3, wherein the providing of the holding braking torque is performed regardless of engagement of a brake pedal of the vehicle via a driver of the vehicle.

5. The method of claim 3, further comprising:

providing a staging torque once the lighting tree is detected and prior to the starting time for the race, in accordance with instructions provided by the processor that are implemented via a drive system of the vehicle.

6. The method of claim 5, wherein the providing of the staging torque is performed regardless of engagement of an accelerator pedal of the vehicle via a driver of the vehicle.

7. The method of claim 3, wherein the step of automatically starting movement of the vehicle comprises:

automatically releasing the holding braking torque, and automatically initiating the providing propulsion torque for movement of the vehicle to start the race, in accordance with instructions provided by the processor, based on the starting time and prior to the starting time, such that movement of the vehicle begins at the starting time; and wherein the method further includes:

obtaining, via one or more additional cameras, interior camera images as to a driver of the vehicle;

determining, via the processor, whether the driver is attentive, based on the interior camera images; and automatically releasing the holding braking torque, and automatically initiating the providing propulsion torque for movement of the vehicle to start the race, in accordance with instructions provided by the processor, only when it is determined that the driver is attentive.

8. A system comprising:

one or more cameras of a vehicle that are configured to obtain exterior camera images as to a lighting tree of a track on which the vehicle is to participate in a race; and a processor of the vehicle that is coupled to the one or more cameras and that is configured to at least facilitate:

detecting a pattern of lights in the lighting tree using the exterior camera images, the pattern of lights comprising one of a plurality of possible racing lighting tree patterns, the detected pattern having known timing delays between each color sequence of the lighting tree;

matching, via the processor, the detected pattern in combination with stored values pertaining to such patterns and a resulting start time stored in a non-transitory computer readable storage medium;

determining a starting time for the race, based on the exterior camera images as to the lighting tree; and automatically starting movement of the vehicle, in accordance with instructions provided by the processor, based on the starting time;

obtaining, via one or more cameras of a vehicle, exterior camera images as to a lighting tree of a track on which the vehicle is to participate in a race;

determining, via a processor of the vehicle, a starting time for the race, based on the exterior camera images as to the lighting tree, and further based on the detected pattern of lights in the lighting tree and the matching in combination with the stored values, including the known timing delays between each color sequence of the lighting tree and the resulting start time, along with initiation of a clock, via the processor, based on the detected pattern of the lights; and automatically starting movement of the vehicle, in accordance with instructions provided by the processor, based on the starting time, based on the detected pattern of lights in the lighting tree and the matching in combination with the stored values, including the known timing delays between each color sequence of the lighting tree and the resulting start time, along with the clock initiated based on the detected pattern of lights.

9. The system of claim 8, wherein the automatic starting of the movement of the vehicle is performed via the instructions provided by the processor while a driver is not engaging a brake pedal of the vehicle, and while the driver is not engaging an accelerator pedal of the vehicle.

10. The system of claim 8, wherein the processor is further configured to at least facilitate providing a holding braking torque once the lighting tree is detected and prior to the starting time for the race, in accordance with instructions provided by the processor that are implemented via a braking system of the vehicle.

11. The system of claim 10, wherein the processor is further configured to at least facilitate providing the holding braking torque regardless of engagement of a brake pedal of the vehicle via a driver of the vehicle.

12. The system of claim 10, wherein the processor is further configured to at least facilitate providing a staging torque once the lighting tree is detected and prior to the starting time for the race, in accordance with instructions provided by the processor that are implemented via a drive system of the vehicle.

13. The system of claim 12, wherein the processor is further configured to at least facilitate providing the staging torque is performed regardless of engagement of an accelerator pedal of the vehicle via a driver of the vehicle.

14. The system of claim 10, wherein the processor is further configured to at least facilitate automatically releasing the holding braking torque, and automatically initiating the providing propulsion torque for movement of the vehicle to start the race, in accordance with instructions provided by the processor, based on the starting time and prior to the starting time, such that movement of the vehicle begins at the starting time.

15. The system of claim 14, further comprising:

one or more additional cameras that are configured to obtain interior camera images as to a driver of the vehicle; and the processor is further coupled to the one or more additional cameras and is further configured to at least facilitate:

determining whether the driver is attentive, based on the interior camera images; and automatically releasing the holding braking torque, and automatically initiating the providing propulsion torque for movement of the vehicle to start the race, in accordance with instructions provided by the processor, only when it is determined that the driver is attentive.

16. A vehicle comprising:

a body;

a drive system configured to move the body;

a braking system configured to provide braking torque for the vehicle;

one or more cameras that are configured to obtain exterior camera images as to a lighting tree of a track on which the vehicle is to participate in a race; and a processor of the vehicle that is coupled to the drive system, the braking system, and the one or more cameras, the processor configured to at least facilitate:

detecting a pattern of lights in the lighting tree using the exterior camera images, the pattern of lights comprising one of a plurality of possible racing lighting tree patterns, the detected pattern having known timing delays between each color sequence of the lighting tree;

matching, via the processor, the detected pattern in combination with stored values pertaining to such patterns and a resulting start time stored in a non-transitory computer readable storage medium;

determining a starting time for the race, based on the exterior camera images as to the lighting tree, via initiation of a clock based on the detected pattern of the lights and the matching in combination with the stored values, including the known timing delays between each color sequence of the lighting tree and the resulting start time based on the detected pattern of the lights;

providing a holding braking torque once the lighting tree is detected and prior to the starting time for the race, in accordance with instructions provided by the processor that are implemented via the braking system, regardless of engagement of a brake pedal of the vehicle via a driver of the vehicle;

providing a staging torque once the lighting tree is detected and prior to the starting time for the race, in accordance with instructions provided by the processor that are implemented via the drive system, regardless of engagement of an accelerator pedal of the vehicle via a driver of the vehicle; and automatically starting movement of the vehicle, in accordance with instructions provided by the processor, via automatically releasing the holding braking torque, and automatically initiating providing of propulsion torque for movement of the vehicle to start the race, in accordance with instructions provided by the processor, based on the starting time and prior to the starting time, including the known timing delays between each color sequence of the lighting tree and the resulting start time based on the detected pattern of the lights and the matching in combination with the stored values, such that movement of the vehicle begins at the starting time.

17. The vehicle of claim 16, further comprising:

one or more additional cameras that are configured to obtain interior camera images as to a driver of the vehicle; and the processor is further coupled to the one or more additional cameras and is further configured to at least facilitate:

determining whether the driver is attentive, based on the interior camera images; and automatically releasing the holding braking torque, and automatically initiating the providing propulsion torque for movement of the vehicle to start the race, in accordance with instructions provided by the processor, only when it is determined that the driver is attentive.

18. The method of claim 1, wherein the lighting tree includes a green starting light, and the automatically starting of the movement of the vehicle is provided in accordance with the instructions provided by the processor such that launching of the vehicle is initiated by the processor prior to the starting time as represented by the green starting light of the lighting tree.

19. The method of claim 18, wherein the automatically starting of the movement of the vehicle further includes commanding a brake hold for the vehicle, in accordance with the instructions provided by the professor, after a brake pedal is released by a driver of the vehicle.

20. The method of claim 19, wherein the lighting tree further includes a plurality of yellow lights that are illuminated prior to the green light, and the method further includes updating and synchronizing a timer associated with the clock utilizing detected illumination of each of the plurality of yellow lights.

* * * * *